E. A. UNVERSAW & L. G. REXROTH.
MACHINE FOR FEEDING SAUSAGE CASINGS.
APPLICATION FILED JULY 11, 1910.
1,059,411.
Patented Apr. 22, 1913.
2 SHEETS—SHEET 2.
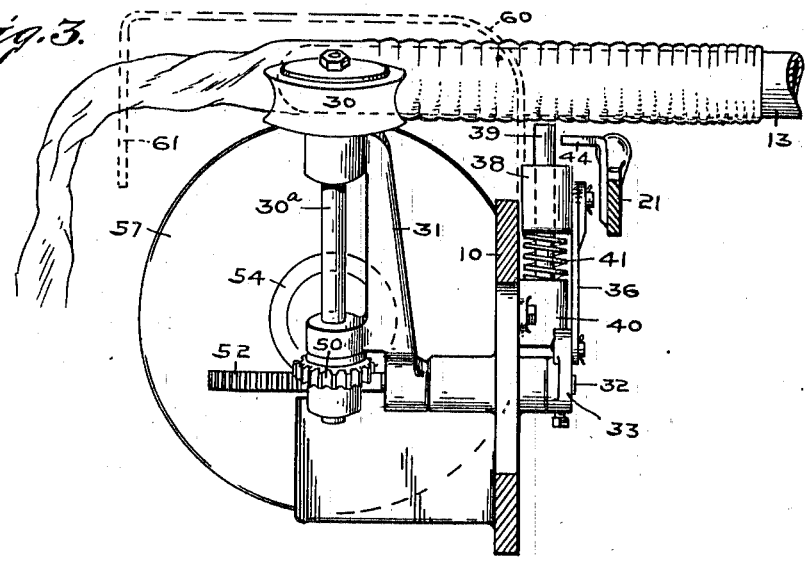
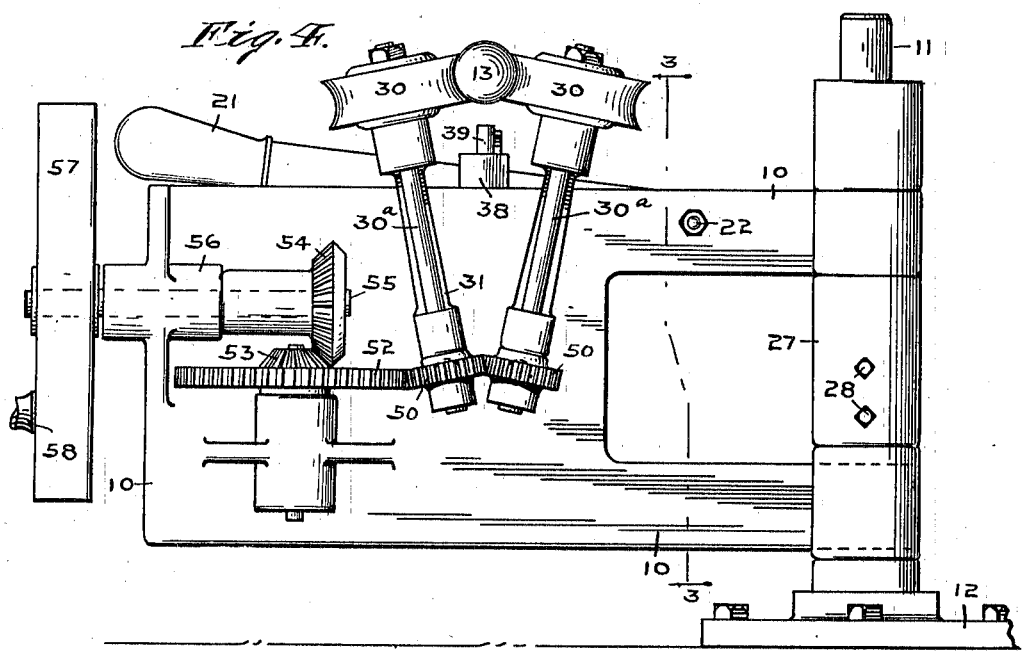
WITNESSES:
Wm L. Bushong
L. B. Woerner
INVENTORS
Edward A. Unversaw
Louis G. Rexroth
By Minturn & Woerner
ATTORNEYS.

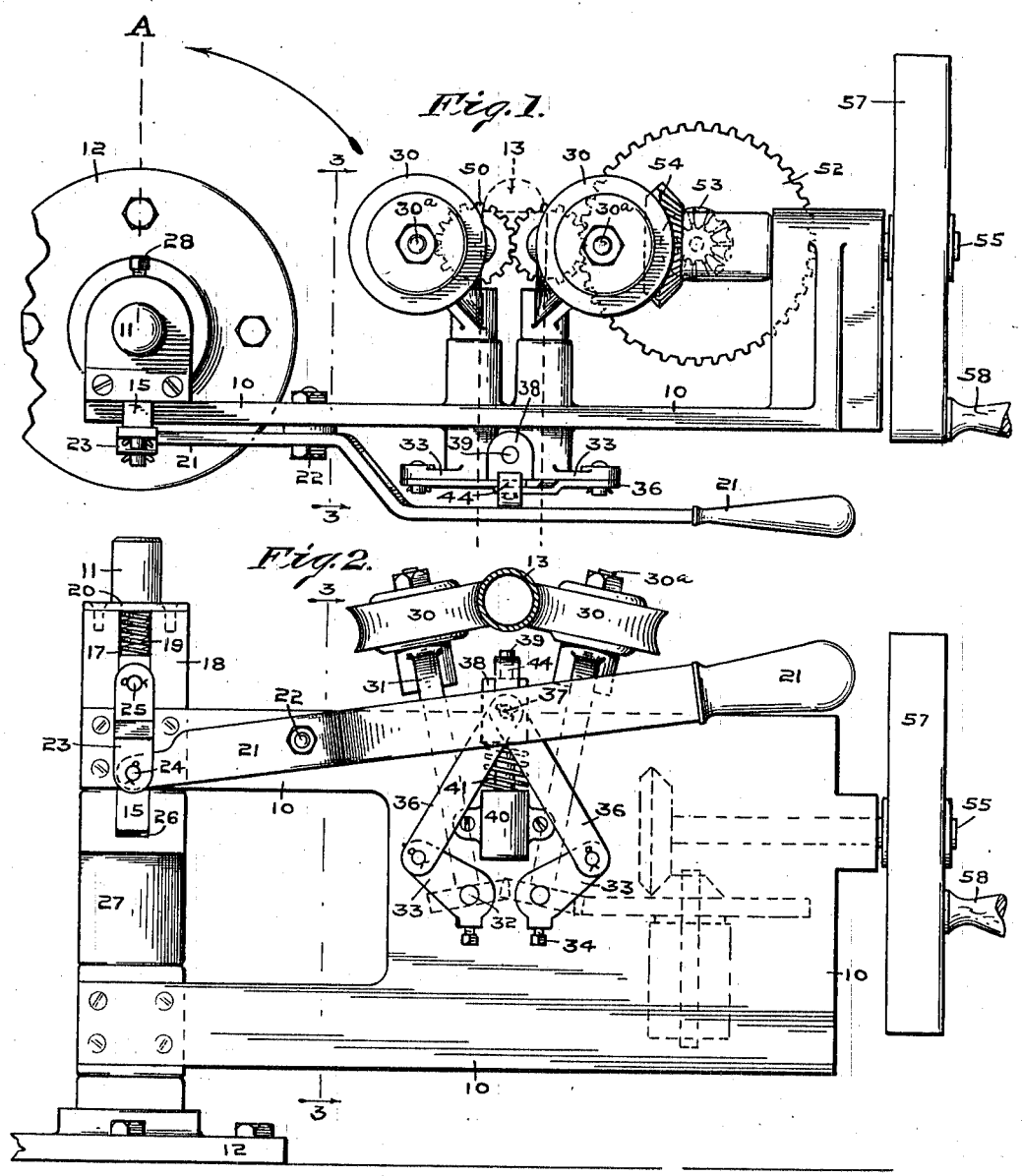

UNITED STATES PATENT OFFICE.

EDWARD A. UNVERSAW AND LOUIS G. REXROTH, OF INDIANAPOLIS, INDIANA.

MACHINE FOR FEEDING SAUSAGE-CASINGS.

1,059,411.     Specification of Letters Patent.     Patented Apr. 22, 1913.

Application filed July 11, 1910.  Serial No. 571,402.

*To all whom it may concern:*

Be it known that we, EDWARD A. UNVERSAW and LOUIS G. REXROTH, citizens of the United States, residing at Indianapolis, in the county of Marion and State of Indiana, have invented certain new and useful Improvements in Machines for Feeding Sausage-Casings, of which the following is a specification.

This invention relates to a machine for placing sausage casings upon the spout of a sausage machine preparatory to the filling of the casings. This part of the work of filling casings is now universally done by hand, the same not only being a tedious operation but consuming considerable time, since these casings generally run from forty to fifty feet in length.

The object of the present invention is to provide a machine by which sausage casings can be expeditiously placed upon the spout of the sausage machine in a mechanical manner.

We accomplish the above object of the invention by means of the machine illustrated in the accompanying drawings, forming a part hereof, in which—

Figure 1 is a top or plan view of the machine for mechanically placing sausage casings upon the spout of a sausage-casing filling machine. Fig. 2 is an elevation of the rear side of the construction shown in Fig. 1. Fig. 3 is a cross-section on the line 3—3 in Figs. 1, 2, and 4. Fig. 4 is an elevation of the front side of the machine.

Referring to the drawings, 10 represents a movable frame, upon which the operating mechanism is mounted, which is swung from the vertical post 11, said post being provided with a base plate 12 which is secured to the frame, or floor, supporting the sausage machine. The frame 10 is mounted immediately in advance of the projecting spout 13 of the sausage machine (not shown), and when swung into operative position the end of the spout of the sausage machine will be forced between the feed rollers for automatically force-feeding the sausage casing upon said spout. At the completion of the operation of placing a sausage casing upon the spout of the sausage filling machine, the frame 10 may be swung or moved away from said spout in a position substantially with the line A shown in Fig. 1, so as to leave the space in advance of the spout and sausage machine free and unobstructed, and thus not interfere with the subsequent operation of filling the sausage casing as the latter is forced away from the spout during said filling process. In order that the frame 10 may be always brought into a determined or fixed position with relation to the spout 13 of the sausage machine, at each succeeding operation of the machine, we provide a locking device which consists of a vertically positioned movable catch 15 which slides in a corresponding groove 17 within the hollow post 18 which is movably mounted upon the fixed post 11. A spring 19 is placed between the upper end of the movable catch 15 and the plate 20 whereby the catch is normally held in a depressed position. A hand lever 21, pivoted at 22 to the frame 10, engages a link 23 at 24 and said link engages the catch 15 at 25, so that when the free end of the lever 21 is depressed the catch 15 will be raised so as to remove the lower end thereof out of the notch 26 located in the member 27, the latter member being rigidly secured to the post 11 by means of the set screws 28. See Figs. 1 and 4. When the catch 15 has been elevated so that its lower edge is moved above the upper edge of the member 27 the frame 10 may then be swung around, the lower end of the catch 15 riding upon the upper end of said member 27. When it is again desired to move the machine into operative position the catch 15 will drop into the notch 26 when the two register, thereby accurately fixing and locking the machine in positive relation with respect to the sausage machine.

The means for mechanically placing the sausage casings upon the spout of the sausage filling machine comprises the two feed rollers 30 which are mounted diametrically opposite each other, each being supported on each side of the spout of the sausage filling machine. These rollers are supported on the shafts 30ª, and the latter have bearings and move with the movable stems 31, the latter being mounted on a pair of horizontally disposed shafts 32 which extend through and are carried by the frame 10. The shafts 32, on the rear side of the frame 10, are provided with the crank-arms 33, the latter being rigidly secured to the said shafts by means of the set screws 34. The outer ends of the crank-arms 33 connect with the links 36 which extend upwardly and toward each other to a common pivot point 37, which pivot point is mounted on a vertically movable block 38. The block 38 is loosely mounted to travel along the vertically disposed pin 39, the latter being held at its lower end in a fixed position by the bracket 40 which is secured to the rear side of the frame 10. A spring 41 is interposed between the bracket 40 and the lower end of the block 38, and the tendency of the spring is to normally hold said block in its uppermost position whereby, through the links 36, crank arms 33, shafts 32 and the movable stems 31, tension is applied to yieldably hold the rollers 30 against each other. When the frame 10 is moved into operative position the hand lever 21 is depressed, and the horizontal portion of the hook 44 (see Figs. 1 and 3) carried by said lever comes into contact with the upper end of the block 38 forcing said block downwardly, this downward movement through the links 36, crank-arms 33, shafts 32 and movable stems 31, causing the rollers 30 to be moved a sufficient distance apart to admit the end of the spout 13. This movement compresses the spring 41 and thereby increases its repelling force in holding the rollers 30 tightly against said spout 13 so that when the frame 10 is in operative position and the sausage casing is started over the end of the spout and is brought under the rollers the latter will press tightly against the casing and force same to travel backward upon said spout. When the frame 10 is moved away from the spout 13 of the sausage machine, by withdrawing the catch 15 from the notch 26, through the operation of the lever 21, heretofore described, the rollers 30 again are simultaneously moved outward to free the spout 13 as has heretofore been described.

The machine may also be provided with the guide-plate 60 (see Fig. 3) by which the sausage casing is arranged to be guided to the end of the spout 13. The guide-plate 60 may be fixed to the frame 10 and then bent to extend forward to the front and then bent downward as shown at 61. The portion 61 is provided with an aperture which would stand arranged approximately in line with the end of the spout 13. The sausage casing would pass through said aperture and be delivered in a straight plane to the ends of the spout 13.

The shafts 30ª, which carry the rollers 30, are provided on their lower ends with intermeshing pinions 50 whereby positive and uniform movement in the desired direction is secured and maintained between said rollers 30. The teeth on the pinions 50 are formed of sufficient length to permit them to intermesh a sufficient distance as to prevent them from being separated when the position of the shafts 30ª is changed relatively to each other, i. e., when it is desired to laterally move the rollers away from the spout 13, by the operation of the hand lever 21. One of the pinions 50 meshes with the horizontally positioned pinion 52, and the latter around its axis is provided with the integral beveled pinion 53 which engages a corresponding pinion 54 mounted on the end of the shaft 55. The shaft 55 is held in proper position by means of the bearing 56 formed on the frame 10. The shaft 55 is also provided with the handwheel 57 and by means of the handle 58 the said wheel may be rotated to impart rotary movement through the intermediate mechanism to the rollers 30.

While we have shown a manually operated machine in the drawings, and as the intermittent use of this kind of machine for placing casings upon the spout of a sausage filling machine enables a machine of this kind to be used about as successfully as a power operated machine, it will be understood that we do not wish to limit ourselves to a machine operated solely by manual power.

Having thus fully described our said invention what we desire to secure by Letters Patent, is—

1. The combination, with a spout of a sausage-casing filling machine, a frame adapted to move into operative relation to said spout, a pair of feed rollers moving with said frame to bring said rollers into contact with the opposite sides of said spout, means for imparting uniform movement of rotation to said rollers, means for yieldably holding said rollers uniformly against the opposite sides of said spout, and means for simultaneously moving said rollers laterally of said spout.

2. The combination, with a spout of a sausage-casing filling machine, a frame adapted to move into operative relation to said spout, means for locking said frame in operative position, a pair of feed rollers mounted on and moving with said frame to bring the rollers into contact with the sides of said spout, a tension device for imparting a uniform tension to the rollers, means for moving said rollers away from said spout and for unlocking said frame from its operative position.

3. The combination, with a spout of a sausage-casing filling machine, a frame adapted to move into operative relation to said spout, means for locking said frame into operative relation to said spout, a pair of feed rollers mounted on and moving with said frame to bring the rollers into contact with the sides of said spout, means for imparting a tension to said rollers, means for imparting uniform movement of rotation to said rollers, and a single means for simultaneously moving said rollers transversely of said spout and for unlocking said frame from its operative position.

In witness whereof, we have hereunto set our hands and seals at Indianapolis, Indiana, this 28th day of May, A. D. one thousand nine hundred and ten.

EDWARD A. UNVERSAW. [L. S.]
LOUIS G. REXROTH. [L. S.]

Witnesses:
F. W. WOERNER,
L. B. WOERNER.

Copies of this patent may be obtained for five cents each, by addressing the "Commissioner of Patents, Washington, D. C."